March 29, 1966  G. W. McCARTY ETAL  3,242,953
SHOE PLATE ALINING MEANS FOR PORTABLE POWER-DRIVEN SAW
Filed May 8, 1964
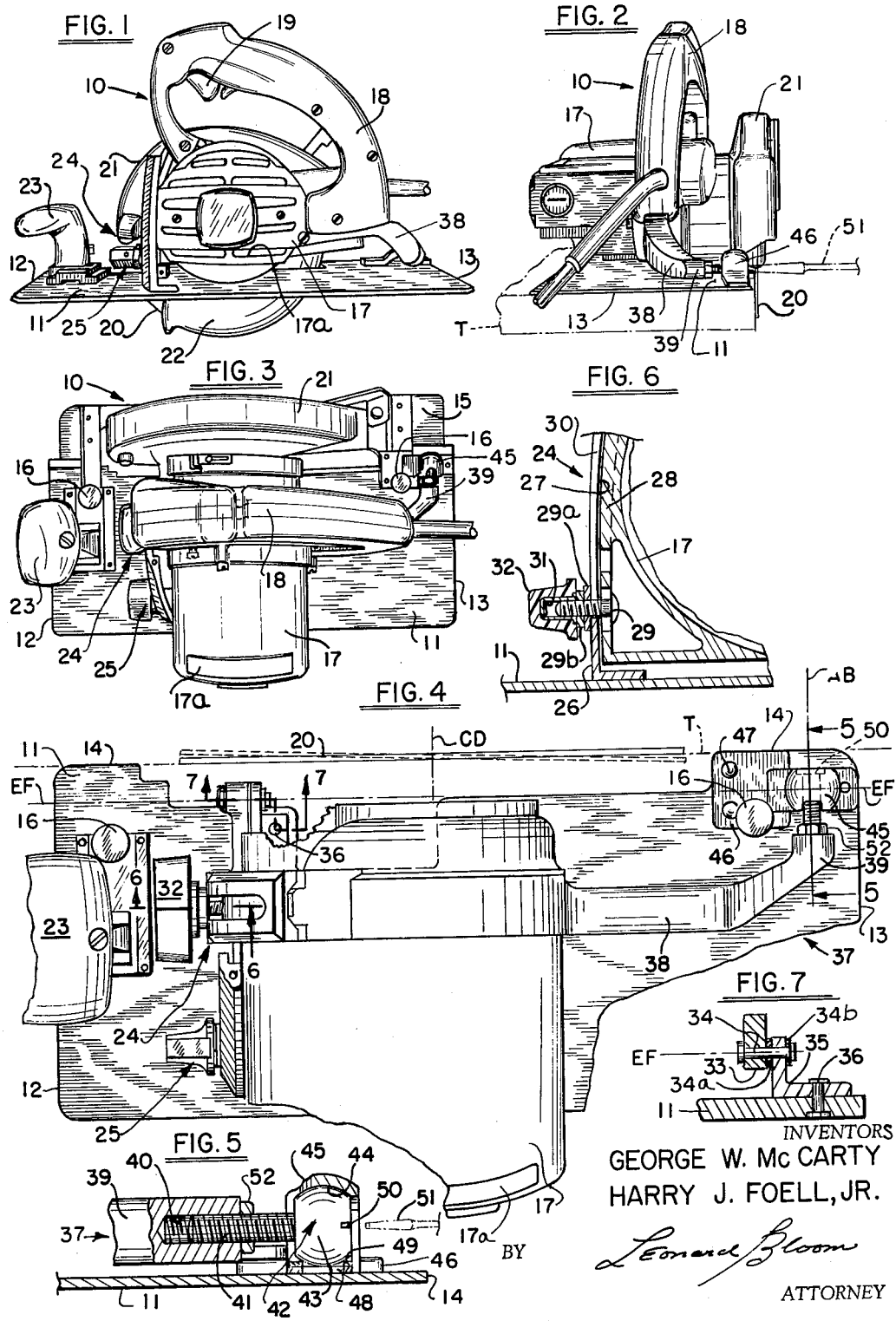
INVENTORS
GEORGE W. McCARTY
HARRY J. FOELL, JR.
BY Leonard Bloom
ATTORNEY United States Patent Office 3,242,953
Patented Mar. 29, 1966

3,242,953
SHOE PLATE ALINING MEANS FOR PORTABLE POWER-DRIVEN SAW
George W. McCarty, Towson, and Harry J. Foell, Jr., Lutherville, Md., assignors to The Black and Decker Manufacturing Company, Towson, Md., a corporation of Maryland
Filed May 8, 1964, Ser. No. 366,021
8 Claims. (Cl. 143—43)

The present invention relates to a shoe plate alining means for a portable power-driven circular saw, and more particularly, to an improvement in the means to aline the plane of the rotating saw blade with the longitudinal side edge of the shoe plate.

In the prior art of which we are aware, some users of portable power-driven circular saws have attempted to aline the saw blade with the longitudinal side edge of the shoe plate by tapping the shoe plate or the housing structure lightly, using a mallet or a hammer, and some manufacturers have even condoned this practice. Other manufacturers have resorted to the use of an enlarged diametrical clearance between the openings in the shoe plate and the body portions of the respective countersunk fastening screws that pass through these openings to engage respective tapped recesses in the housing structure, and the user is instructed to loosen the screws and then manually adjust the shoe plate until its guide edge is alined with the blade. However, this procedure is awkward, and besides, it is somewhat difficult to maintain the alinement in the final step of tightening the screws. Still others in the art have suggested the use of a camming means, one which is carried on the underside of the shoe plate, for moving the shoe plate with respect to the housing to aline the longitudinal side edge of the shoe plate with the plane of the saw blade. The camming means includes an eccentrically-mounted washer retained in an elongated slot formed in the underside of the shoe plate. This approach, however, is generally unsatisfactory. To adjust the alinement, its is necessary to invert the entire unit or at least tilt the unit on its side, next to loosen the fastening screws between the shoe plate and the motor housing, then to manually adjust the cam washer to effect blade alinement, and finally, to tighten the fastening screws. This procedure is somewhat awkward and unwieldly and does not facilitate an easy and accurate adjustment of the blade alinement.

Accordingly, it is an object of the present invention to alleviate the deficiencies of the prior art by providing a simple and effective means for easily and accurately alining the blade of a portable electric saw with the longitudinal side edge of the shoe plate.

It is another object of the present invention to aline the blade while the unit is in a normal, upright position and is supported on top of a table or workpiece—the shoe plate of the unit resting on top of the table, and the blade projecting over the side of the table and positioned in close to the adjacent side edge of the table—such that the user may view the plane of the blade from the end of the unit and accurately aline the blade with the longitudinal side edge of the shoe plate.

It is yet another object of the present invention to provide an adjustment member which is suitably retained on top of the shoe plate and is easily accessible to the user, the adjustment member having a screw-threaded means which provides an inherent mechanical advantage for facilitating an easy, yet accurate, adjustment.

It is a further object of the present invention to provide a blade alinement means which forces the housing structure of the unit to "spring," that is, to yield slightly or deflect about its securing means to the shoe plate.

It is a still further object of the present invention to provide a blade alinement means which is incorporated in the depth and bevel adjustment means for the overall saw.

The present invention may be used in conjunction with a portable power-driven circular saw of the type comprising a substantially-flat shoe plate having a guide edge portion, a housing structure and means to secure the structure on top of the shoe plate, a motor on the housing structure, and a rotary saw blade driven by the motor and extending through a slot in the shoe plate to engage the work.

In accordance with the teachings of the present invention, there is herein illustrated and described, an improved means to aline the saw blade with the guide edge portion of the shoe plate, and this improved alinement means comprises a first member carried by the housing structure, a second member carried by the shoe plate, and means to secure the members together. At least one of the members is manually adjustable and is provided with a screw-thread means; and this one member may be adjusted so as to force the housing structure to yield slightly about its securing means to the shoe plate, thereby altering the axis of blade rotation with respect to the shoe plate, and thereby bringing the plane of the saw blade into alinement with the guide edge portion of the shoe plate.

In accordance with the further teachings of the present invention, the improved alinement means comprises an arm member secured to the housing and extending therefrom towards one end of the shoe plate along an axis which is substantially perpendicular to the axis of blade rotation. This arm member has an integral rear portion bent at right angles thereto along an axis which is substantially parallel to the axis of blade rotation. The integral rear portion of the arm member is provided with a screw-threaded portion, preferably in the form of an internally-threaded blind axial bore. A retainer (in the nature of a bracket) is secured on the shoe plate adjacent to the respective end of the plate. An adjustment member is rotatably supported within the retainer and is held against axial displacement with respect to the shoe plate. The adjustment member has an axis of rotation which is substantially parallel to the axis of the rotating saw blade, and the adjustment member is provided with an integral screw-threaded portion which engages the corresponding threaded portion on the arm member. Consequently, a rotation of the adjustment member (in one direction or another) will alter the blade axis with respect to the shoe plate and thus aline the plane of the blade with the longitudinal guide edge of the shoe plate.

These and other objects of the present invention will become more apparent from a reading of the following specification, taken in conjunction with the enclosed drawings, in which:

FIGURE 1 is an elevation, viewed from the rear of the motor housing, of a typical portable power-driven circular saw with which the teachings of the present invention may find particular utility;

FIGURE 2 is a rear elevation of the saw, the outboard shoe plate being removed, the lower guard being telescoped within its upper guard to facilitate an alinement of the blade, and the broken lines indicating the table upon which the saw is supported as well as the position of a screwdriver blade used in making an adjustment;

FIGURE 3 is a top plan view of the saw illustrated in FIGURE 1;

FIGURE 4 is a top plan view drawn to an enlarged scale, the upper handle being removed as well as the upper and lower guards, the blade being shown by solid lines (with its misalined position in phantom) and the axis of blade rotation as well as the pivot axes of the housing being illustrated schematically by the broken lines, the view showing the means to secure the motor housing and its structure to the shoe plate, and further showing the means to aline the plane of the saw blade with the longitudinal side edge of the shoe plate, the latter means including an arm member secured to the motor housing and extending therefrom towards one end of the shoe plate;

FIGURE 5 is a section view, taken along the lines 5—5 of FIGURE 4, enlarged over the scale of FIGURE 4, and showing the integral right-angularly bent rear portion of the arm member screw-threaded to an adjustment member which is rotatably retained on top of the shoe plate;

FIGURE 6 is a section view, taken along the line 6—6 of FIGURE 4 and showing the manner in which the motor housing is adjustably secured to a depth control channel; and FIGURE 7 is a section view, taken along the lines 7—7 of FIGURE 4, enlarged slightly over the scale of FIGURE 4, and showing the manner in which the depth control channel is secured to the shoe plate.

With reference to FIGURES 1, 2, and 3, there is illustrated a portable electric saw 10 with which the teachings of the present invention may find particular utility; however, it will be appreciated by those skilled in the art, that the teachings of the invention are equally applicable to other types of portable power-driven tools having a rotating blade. With this in mind, and for orientation purposes, the saw 10 includes a substantially-flat shoe plate 11, by means of which the saw may be supported on the top surface of a workpiece; and the shoe plate 11 has a front end portion 12, a rear end portion 13, and a longitudinal side edge 14. This longitudinal side edge 14, or its guide edge equivalent, forms one of the side edges with which the saw 10 may be guided along the top surface of a workpiece in a manner familiar to one skilled in the art. An auxiliary outboard shoe plate 15, see FIGURE 3, is detachably mounted to the shoe plate 11 by means of a pair of clamping screws 16. A housing structure 17 is secured on top of the shoe plate 11, and the structure 17 includes a housing for an electric motor (not shown) which is cooled through air inlet slots 17a. An overhead handle 18 is secured to the housing, and a trigger switch 19 is carried in the handle for energizing the motor. The motor drives a rotary saw blade 20, see FIGURE 2, which is enclosed by an upper guard 21 and a pivoted lower guard 22, the latter telescoping within the upper guard as the cut is made. A front knob 23 serves as an auxiliary handle by means of which the saw 10 may be controlled and guided. A depth control means, generally denoted as at 24, is provided for raising and lowering the housing structure 17 with respect to the shoe plate 11, thereby regulating the depth of cut of the blade 20; the pivot axis of the housing structure 17 is denoted by the letters AB, see FIGURE 4, and it is parallel to the blade axis CD. A bevel control means, denoted generally as at 25, is provided for tilting the housing structure 17 with respect to the shoe plate 11 about an axis EF (perpendicular to the blade axis CD) to thereby facilitate the making of a bevel cut up to 45° in one direction.

The depth control means 24 forms part of the means to secure the housing 17 to the shoe plate 11; and with reference to FIGURES 4, 6, and 7, the depth control means 24 includes an arcuately-formed channel member 26, which has a keyway 27, see FIGURE 6, to receive a complementary-formed arcuate key 28 carried on the front of the housing 17. The channel member 26 is adjustably secured to the housing 17 by means of a screw 29, see FIGURE 6, which is carried by the housing 17 and extends through a slot 30 in the channel 26. The screw 29 carries a washer 29a and spring washer 29b and is received in a tapped sleeve 31 secured within the knob 32. The channel member 26 has a laterally-extending base portion 33, see FIGURE 7, which is pivotally mounted upon a pin 34. The pin 34 carries a spring washer 34a and is retained by means of a split ring 34b. The other end of the pin 34 is journaled in a bracket 35 that is secured to the shoe plate by rivets 36, and the axis of the pin 34 (denoted by EF) is substantially perpendicular to the axis CD of the blade 20 and comprises the axis about which the housing 17 may be pivoted or tilted to make a bevel cut. As understood by those skilled in the art, however, other means for facilitating a bevel cut, or for regulating the depth of cut, or to secure the housing structure 17 to the shoe plate 11, may be employed and are equally applicable to the teachings of the present invention. The structural details of the depth control means 24 and the bevel control means 25, and the functions thereof which form no part of the present invention, may be obtained with reference to the co-pending McCarty et al. application, Ser. No. 366,070, filed May 8, 1964, and assigned to the assignee of the present invention.

With reference to FIGURES 4 and 5, the teachings of the present invention relate to an improved means for alining the saw blade 20 with the longitudinal side edge 14 (or equivalent guiding edge portion) of the shoe plate 11, and more specifically, the inside flat surface of the blade 20, see FIGURE 4, with respect to the longitudinal side edge 14. This improved alinement means, generally denoted as at 37, includes a first member, preferably in the form of an arm member 38, see FIGURE 4, which is integrally cast with (or otherwise secured to) the housing structure 17, and which extends towards the rear end 13 of the shoe plate 11 along an axis which is substantially perpendicular to the axis CD of blade rotation. The arm member 38 has an integral rear portion 39 which is bent substantially at right angles thereto, extends in a direction towards the longitudinal side edge 14 of the shoe plate 11, and has an axis which is substantially parallel to the axis CD of blade rotation. The integral rear portion 39 of the arm member 38 is preferably formed with an internally-threaded blind axial bore 40 which receives an externally-threaded extension 41 formed integrally with an adjustment member 42. The adjustment member 42 preferably comprises a spherically-formed knuckle 43 (in the nature of a bearing) which is seated in a semi-spherical seat 44 formed in the socket portion 45 of a retainer 46. The retainer 46 is in the nature of a bearing bracket and is secured on top of the shoe plate 11 (alongside of the longitudinal side edge 14 thereof) by means of rivets 47 or other suitable means. A spacer washer 48, see FIGURE 5, is retained within the bracket retainer 46, and a spring washer 49 is retained between the spacer washer 48 and the spherical knuckle 43, thereby constantly urging the knuckle 43 against its seat 44.

The spherical knuckle 43 (in combination with the arm member 38 and bracket retainer 46) forms an additional means to pivotably secure the housing structure 17 to the shoe plate 11 on the side of the housing which is opposite to the primary securing means; this pivotal auxiliary support provides for a pivoting of the housing 17 with respect to the shoe plate 11 about two axes, one of which (AB) is substantially parallel to the axis CD of blade rotation, and the other of which (EF) is substantially perpendicular to the axis CD. The first pivot axis, as previously discussed, facilitates a regulation in the depth of cut, while the other pivot axis facilitates a bevel cut.

The spherical knuckle 43 of the adjustment member 42 has a screwdriver kerf 50, see FIGURE 5, to receive the blade of a screwdriver 51. The adjustment member 42 is rotatably supported in the retainer 46, but is held against axial displacement with respect to the shoe plate 11. When the adjustment member 42 is turned in one direction or another, its threaded portion 41 will advance or retract the internally-threaded integral rear portion 39 of the arm member 38, which is secured to the housing 17. The effect will be to force the housing structure 17 to, in effect "spring," that is, to yield or deflect slightly about its securing means to the shoe plate 11. Inasmuch as the motor is part of the housing structure 17, the motor and hence the axis CD of the rotating saw blade 20 will be altered with respect to the shoe plate 11; and hence the plane of rotation of the blade 20, and more specifically its inside flat surface, see FIGURE 4, will be alined with the longitudinal guide edge 14 of the shoe plate 11. The blade alinement is then held by means of a lock nut 52. The alinement may be effected while the unit is supported in its normal, upright position on a board or table T, see FIGURE 2; and the alinement may be made by bringing the side edge (or edges) 14 of the shoe plate 11 alongside the edge of the board to coincide with it, then by looking down on the unit, making the adjustment of the member 42 so that the blade 20 is alined with the edge 14. If desired, however, the inside flat surface of the blade may be brought in flush against the side edge of the board, and then the alinement made by visually comparing the position of the longitudinal side edge 14 of the shoe plate 11, and more specifically, its parallelism with respect to the corresponding side edge of the board or table. Other comparisons, however, may be employed in accordance with the teachings of the present invention.

In summary, the improved alinement means of the present invention comprises a first member, the arm 38, which is carried by the housing structure 17; a second member, the adjustment member 42, which is retained on top of the shoe plate 11; means to secure the members together; and at least one of the members, preferably the member 42, being manually adjustable and being provided with a screw-thread means 41. Adjustment of the member 41 then forces the housing structure 17 to yield slightly about its securing means to the shoe plate 11, thereby altering the blade axis CD and bringing the plane of the saw blade 20 into alinement with the guide edge portion 14 of the shoe plate 11.

The present invention therefore provides an improved blade alinement means for a portable power-operated circular saw, such as a portable electric saw, and it facilitates a quick and easy alinement, one which has the mechanical advantage of the screw thread. An adjustment in the alinement may be made very accurately, yet conveniently, while the saw is maintained in its normal position; and it is not necessary to invert or tilt the unit, to loosen a number of fastening screws, and to manually manipulate a special camming washer in attempting to aline the blade. Rather, and as shown in FIGURE 2, the blade 20 may be alined very accurately and conveniently while the unit is supported on a table or other work surface. Moreover, the structure of the present invention does not detract from the accuracy, ruggedness, and economy of the means for securing the housing to the shoe plate and providing for depth and bevel adjustments, and indeed, part of the structure of the present invention is preferably incorporated with the pivot means, comprising the spherical knuckle 43, that facilitates the depth and bevel adjustments of the saw.

Obviously, many modifications may be made without departing from the basic spirit of the present invention; and accordingly, within the scope of the appended claims, the invention may be practiced other than has been specifically described herein.

We claim:

1. In a portable power-driven circular saw of the type comprising a shoe plate having a guide edge portion, a housing structure and means to secure the structure on the shoe plate, a motor on the housing structure, and a rotary saw blade driven by the motor and extending through a slot in the shoe plate, the improvement in means to aline the saw blade with the guide edge portion of the shoe plate, which comprises:

(a) a first member carried by the housing structure;
(b) a second member carried by the shoe plate;
(c) means securing said members together; and
(d) at least one of said members being manually adjustable and being provided with a screw-thread means;
(e) whereby said one member may be adjusted to force the housing structure to yield slightly about its securing means to the shoe plate, thereby altering the axis of blade rotation with respect to the shoe plate and bringing the plane of the saw blade into alinement with the guide edge portion of the shoe plate.

2. In a portable power-driven circular saw of the type comprising a shoe plate having respective end portions and a longitudinal side edge by means of which the saw may be guided, a housing structure and means to secure the structure to the shoe plate, a motor on the housing, and a rotary saw blade driven by the motor and extending through a slot in the shoe plate, the improvement in means to aline the saw blade with the longitudinal side edge of the shoe plate, which comprises:

(a) an arm member secured to the housing and extending therefrom towards one end of the shoe plate;
(b) a retainer secured on the shoe plate adjacent to the respective end of the plate;
(c) an adjustment member and means to rotatably retain said adjustment member in said retainer;
(d) said adjustment member having an axis of rotation which is substantially parallel to the axis of the rotating saw blade; and
(e) a screw-thread connection means between said adjustment member and the end of said arm member, whereby the rotation of said adjustment member alters the blade axis with respect to the shoe plate and thereby alines the plane of the blade with the longitudinal side edge of the shoe plate.

3. The improvement of claim 2, wherein:

(a) said arm member is cast integrally with the motor housing and extends from the motor housing along an axis which is substantially perpendicular to the axis of blade rotation;
(b) said arm member having an integral rear portion which is bent at right angles thereto along an axis substantially parallel to the axis of blade rotation;
(c) said integral rear portion extending in a direction towards the longitudinal side edge of the shoe plate; and wherein:
(d) said connection means between said arm member and said adjustment member, comprises:
    (1) an internally-threaded axial bore formed in said integral rear portion of said arm member; and
    (2) an externally-threaded extension formed integrally with said adjustment member and received in said bore of said arm member portion.

4. The improvement of claim 2, wherein:

(a) said adjustment member includes a spherical knuckle; and wherein:
(b) said means to rotatably retain said adjustment member in said retainer, comprises:
    (1) a socket formed on said retainer;
    (2) said socket having an upper portion provided with a semi-spherical seat which receives said spherical knuckle of said adjustment member; and
    (3) resilient means retained by said retainer for constantly urging said knuckle against its seat.

5. The improvement of claim 4, wherein:

(a) said spherical knuckle of said adjustable member has a screw-driver kerf facing the longitudinal side edge of the shoe plate.

6. In a portable power-driven circular saw of the type comprising a shoe plate having respective end portions and a longitudinal side edge by means of which the saw may be guided, a housing structure and means to secure the structure on the shoe plate, a motor on the housing structure, and a rotary saw blade driven by the motor and extending through a slot in the shoe plate, the improvement in means to aline the saw blade with the longitudinal side edge of the shoe plate, which comprises:
- (a) an arm member secured to the housing and extending therefrom towards one end of the shoe plate along an axis which is substantially perpendicular to the axis of blade rotation;
- (b) said arm member having an integral rear portion bent at right angles thereto along an axis which is substantially parallel to the axis of blade rotation;
- (c) said integral rear portion of said arm member having a screw-threaded portion;
- (d) a retainer secured on the shoe plate adjacent to the respective end of the plate;
- (e) an adjustment member and means to rotatably retain said adjustment member in said retainer;
- (f) said adjustment member having an axis of rotation which is substantially parallel to the axis of the rotating saw blade; and
- (g) said adjustment member further having an integral screw-threaded portion engaging said threaded portion of said arm member, whereby the rotation of said adjustment member alters the blade axis with respect to the shoe plate and thereby alines the plane of the blade with the longitudinal side edge of the shoe plate.

7. In a portable power-driven circular saw of the type comprising a shoe plate having a guide edge portion, a housing structure and means to secure the structure on the shoe plate, a motor on the housing structure, and a rotary saw blade driven by the motor and extending through a slot in the shoe plate, the improvement in means to aline the saw blade with the guide edge portion of the shoe plate, which comprises:
- (a) an adjustment member;
- (b) means rotatably supporting said adjustment member on top of the shoe plate for rotation about an axis which is substantially parallel to the axis of the rotating saw blade;
- (c) said last-named means including means to retain said adjustment member against axial displacement thereof with respect to the shoe plate; and
- (d) a screw-thread engagement means connecting said adjustment member to the housing structure;
- (e) whereby said adjustment member may be rotated to force the housing structure to yield slightly about its securing means to the shoe plate, thereby altering the axis of blade rotation with respect to the shoe plate, and thereby bringing the plane of the saw blade into alinement with the guide edge portion of the shoe plate.

8. In a portable power-driven circular saw of the type comprising a shoe plate having a guide edge portion, a housing structure and means to secure the structure on the shoe plate, a motor on the housing structure, and a rotary saw blade driven by the motor and extending through a slot in the shoe plate, the improvement in means to aline the saw blade with the guide edge portion of the shoe plate, which comprises:
- (a) means to pivotably secure the housing structure to the shoe plate on the side of the housing structure which is opposite from the securing means;
- (b) said means providing for movement of the housing structure with respect to the shoe plate about two mutually-perpendicular axes, one of which is substantially parallel to the axis of blade rotation, and the other of which is substantially perpendicular to the blade axis; and
- (c) a rotatable adjustment member included in said last-named means;
- (d) said member having means to force the housing structure to yield slightly about its securing means to the shoe plate, thereby altering the axis of blade rotation with respect to the shoe plate, and thereby bringing the plane of the saw blade into alinement with the guide edge portion of the shoe plate.

No references cited.

WILLIAM W. DYER, JR., *Primary Examiner.*

W. D. BRAY, *Assistant Examiner.*